(12) United States Patent
West

(10) Patent No.: US 9,917,445 B2
(45) Date of Patent: Mar. 13, 2018

(54) GRID-TIED SOLAR PHOTOVOLTAIC POWER SYSTEM WITH DYNAMIC GRID POWER STABILIZATION

(71) Applicant: Richard Travis West, Cayucos, CA (US)

(72) Inventor: Richard Travis West, Cayucos, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 202 days.

(21) Appl. No.: 14/944,984

(22) Filed: Nov. 18, 2015

(65) Prior Publication Data

US 2017/0141577 A1 May 18, 2017

(51) Int. Cl.
*H02J 9/00* (2006.01)
*H02J 3/38* (2006.01)
*H02J 9/06* (2006.01)
*H02J 7/35* (2006.01)

(52) U.S. Cl.
CPC ............... *H02J 3/383* (2013.01); *H02J 7/35* (2013.01); *H02J 9/062* (2013.01)

(58) Field of Classification Search
CPC ............... H02J 3/383; H02J 7/35; H02J 9/062
USPC ........................................................ 307/66
See application file for complete search history.

(56) References Cited

U.S. PATENT DOCUMENTS

| | | | |
|---|---|---|---|
| 9,520,764 B1* | 12/2016 | Bundschuh | H02M 1/08 |
| 2009/0086520 A1* | 4/2009 | Nishimura | H02M 3/33576 363/133 |
| 2011/0043160 A1* | 2/2011 | Serban | G05F 1/67 320/101 |
| 2013/0226484 A1* | 8/2013 | Rouvala | H02J 3/24 702/61 |
| 2014/0159491 A1* | 6/2014 | Kusunose | H02J 3/383 307/52 |
| 2014/0278332 A1* | 9/2014 | Grammatikakis | H02S 50/00 703/18 |

\* cited by examiner

*Primary Examiner* — Alfonso Perez Borroto
(74) *Attorney, Agent, or Firm* — Renner, Otto, Boisselle & Sklar, LLP

(57) ABSTRACT

The invention is an apparatus for and method of configuring a solar PV system where the output power of the system is stabilized under dynamic cloud cover conditions. The invention comprises a typical grid-tied solar photovoltaic power system which includes solar modules and a typical grid-tied DC to AC power converter and a second, semi-autonomous, bidirectional power converter coupled between the same electrical grid and storage batteries. The system also includes sensors and/or a communication link between the two power converters. The composite system acts to stabilize the amount of power into the grid by monitoring dynamic power reductions in PV power production and by supplying power from the storage batteries to the grid during a PV power dropout event, for a net smoothing of the amount of power injected into the grid over a wide range of dropout event durations.

7 Claims, 2 Drawing Sheets

GRID-TIED SOLAR PHOTOVOLTAIC POWER SYSTEM WITH DYNAMIC GRID POWER STABILIZATION

BACKGROUND OF THE INVENTION

Solar photovoltaic (PV) power systems have obvious availability issues. Without an energy storage system component, solar-sourced energy cannot be used at night. In addition, cloud cover directly effects PV power production in essentially two ways; static and dynamic. On days with static overcast conditions, power production will be reduced by a predictable amount. On days with moving broken cloud cover, the PV system power output will be unpredictable on a minute-to-minute basis. Dynamic changes in solar PV power production may lead to local grid instabilities in areas of high solar power penetration and, as such, may present a barrier to widespread adoption of solar power.

BRIEF SUMMARY OF THE INVENTION

The invention is an apparatus for and method of configuring a solar PV power system where the output power of the system is stabilized under dynamic cloud cover conditions. The invention comprises a typical grid-tied solar photovoltaic power system which includes solar modules and a typical grid-tied DC to AC power converter and a second, semi-autonomous, bidirectional power converter coupled between the same electrical grid and storage batteries. The system also includes sensors and/or a communication link between the two power converters. The composite system acts to stabilize the amount of power into the grid by monitoring dynamic power reductions in PV power production and by supplying power from the storage batteries to the grid during a PV power dropout event, for a net smoothing of the amount of power injected into the grid over a wide range of event durations.

UTILITY OF THE INVENTION

The invention provides local electrical grid stability in areas of high PV penetration. Power is converted with very little power conversion losses since a minimum number of power conversions required to achieve the desired power leveling effects. The invention will work with virtually any grid-tied PV power system because PV solar module string voltages and the energy storage battery voltages may be disparate and are autonomous.

The invention may also be used for time-of-use cost savings where the storage batteries are charged in the early AM and discharged into the grid to cover periods of peak grid load demand. The invention may also be used to enable local net zero utility grid power consumption by using solar-source energy at night from energy storage batteries charged during daylight hours. The invention may also be used to provide dispatched or pre-programmed electrical grid voltage support by generating VARs or by injecting real power at strategic times. The invention may also be used, with the addition of an electrical grid isolation contactor to supply backup power to local loads during an electrical power grid outage.

The invention may be applied in all electrical power grids including smart girds and may be most beneficial in micro-grid applications.

DETAILED DESCRIPTION OF THE INVENTION

In this section, current into and power delivered to the electrical grid may be used interchangeably. This is under the assumptions that the electrical grid rms voltage is constant and that power factors are unity.

Figure 1:
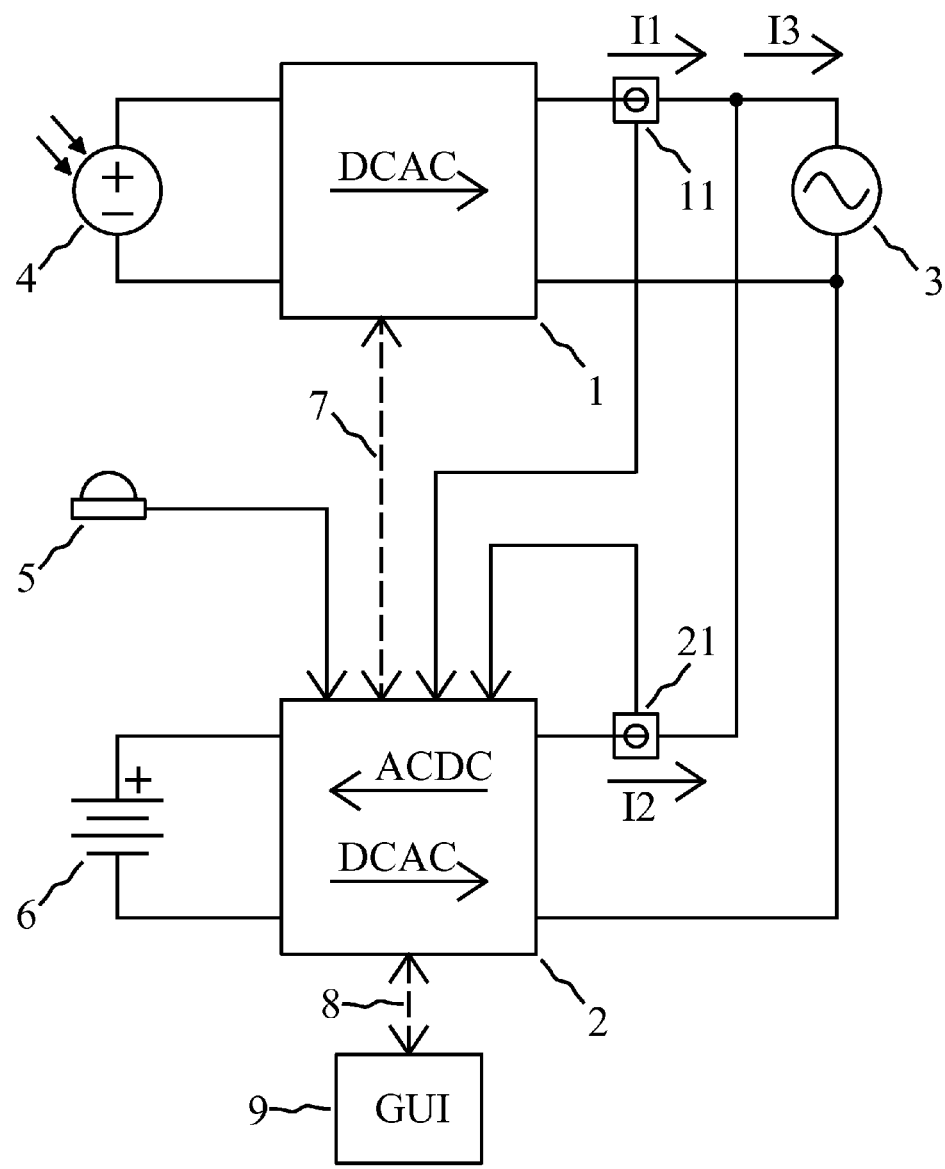
FIG. 1 is an electrical block diagram of a grid-tied PV solar power system with energy storage according to the preferred embodiment of the invention.

FIG. 1 shows the preferred embodiment of the invention. PV grid-tied inverter 1 is coupled between solar photovoltaic (PV) array 4 and electrical utility grid 3. PV grid-tied inverter 1 converts DC power from PV array 4 to AC power and delivers this AC power to utility grid 3. Bidirectional power converter 2 is coupled between energy storage battery 6 and electrical grid 3. Bidirectional power converter 2 is capable of either DC-to-AC power transfer from storage battery 6 to electrical grid 3 or AC-to-DC power transfer from electrical grid 3 to storage battery 6. Both PV power converter 1 and bidirectional power converter 2 are functional subsystems which include power circuits and embedded control circuits. Current sensor 11 measures I1, the current out of PV power converter 1 and into electrical grid 3. Current sensor 21 measures I2, the current out of bidirectional power converter 2 and into electrical grid 3. I3 is the sum of currents from power converters 1 and 2 into electrical grid 3. Current sensors 11 and 21 may be internal or external to power converters 1 and 2.

In FIG. 1 in a second embodiment, there is a communications link between power converters 1 and 2.

In FIG. 1, in a third embodiment, pyranometer 5 is coupled to power converter 2.

In FIG. 1, PV power converter 1 functions in an autonomous manner, typically converting all of the available DC power from PV array 4 into AC power delivered to electrical grid 3. Bidirectional power converter 2 monitors the output of PV power converter 1 with current sensor 11 and responds to power "dropouts" or short term departures from average power levels by supplying makeup current I2 to hold the net current I3 into electrical grid 3 at a short-term, historical average level. The primary intended function of the system is to remove short-term power fluctuations from power delivered to electrical grid 3 due to broken cloud cover passing over and dynamically shadowing PV array 4. Current sensor 21 is used to provide current feedback to bidirectional power converter 2 embedded control circuits to regulate the required makeup current.

In a second functional embodiment, external current sensors 11 and 21 are not used and instantaneous output power or output current information is transmitted between power converters 1 and 2 over communications link 7.

In a third functional embodiment, pyranometer 5, is used near the location of PV array 4 to provide dynamic solar irradiance information to bidirectional power converter 2. This information may be used directly to supply a predicted makeup current from power converter 2 or as part of a more complex algorithm to establish short and long term average PV array 4 power output values.

In all embodiments, the average performance of PV array 4 may be learned by bidirectional power converter 2 over minutes, days, months and/or seasons to best predict the most appropriate system response. This may include analysis of the system performance with respect to the desired leveling of power into the grid under various dropout and cloud cover scenarios. For example, the rate of power output change of PV power converter 1 could be used to characterize the speed of cloud movement and the depth of dropout could be used to characterize the opacity of the clouds verses that of the unclouded sky. In both examples, these volatility factors could be part of a control algorithm to adjust control system response times to ensure the most accurate dropout cancellation.

In FIG. 1, graphic user interface 9 communicates with bidirectional power converter 2 over communication link 8. Communications link 8 may be wired, wireless or any other known method and may include capability to allow control by the local electric utility provider. The end user of the system according to the present invention may program a number of system operational modes via graphic user interface 9.

In FIG. 1, storage battery 6 could be charged during the day from electrical grid 3 at some constant base rate to keep the battery armed for anticipated PV power dropout events. Storage battery 6 could also be charged in early AM hours when electrical grid demand is low. Different system operational modes will have specific charging algorithms associated with an optimum modal performance.

Figure 2A:
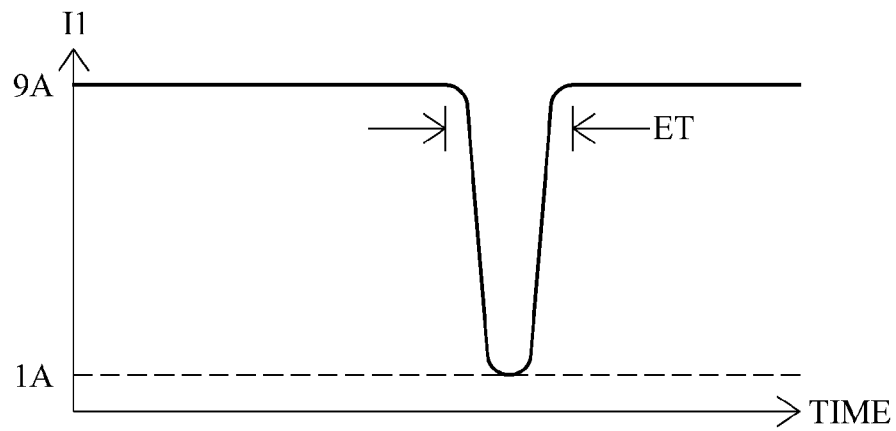
FIGS. 2A, 2B and 2C illustrate how dynamic reductions in PV sourced current are made up or compensated for with energy-storage-battery-sourced current during a broken cloud movement event over the PV solar array.
Figure 2B:
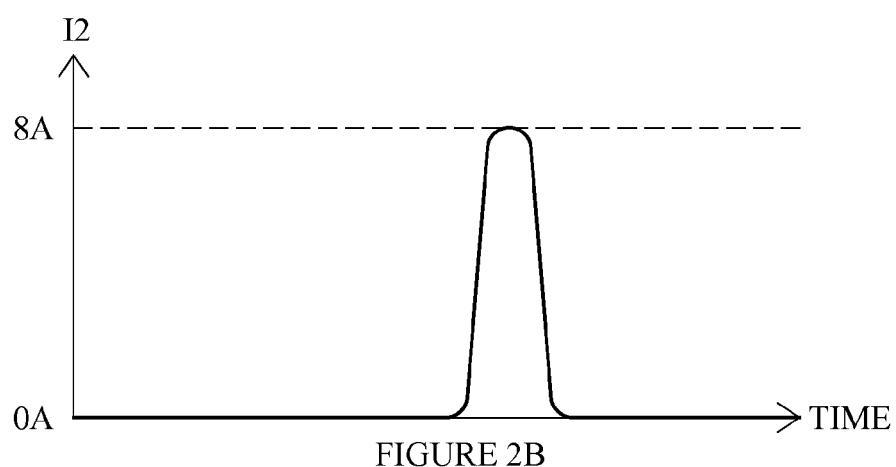
Figure 2C:

FIG. 2A shows current I1 with power sourced from PV array 4 (FIG. 1 reference), current I2, with power sourced from storage battery 6 (FIG. 1 reference) and where current I3 the sum of I1 and I2 is the net current into electrical grid 3. FIG. 2A shows an average current level of 9 Arms and a peak 8 Arms drop in current, during a moving cloud cover event with duration ET. In FIG. 2B, bidirectional power converter 2 (FIG. 1 reference) supplies 8 Arms of peak current to counter or "fill in" the short term current deficit into electrical grid 3 (FIG. 1 reference). In FIG. 2C, the net current into electrical grid 3 (FIG. 1 reference) is 9 Arms, the same value as the original average current level in FIG. 1A. The net desired effect is that electrical grid 3 (FIG. 1 reference) essentially never "sees" the fluctuation in power caused by the moving cloud cover event.

What I claim as my invention is:

1. An electrical-grid-tied solar photovoltaic power system for suppling AC power to an electrical grid comprising;
    solar photovoltaic modules;
    a solar grid-tied inverter;
    energy storage batteries; and
    a bidirectional grid-tied power converter and a means for communicating an output power level or an output current level of said solar grid-tied inverter to said bidirectional grid-tied power converter,
    wherein power and control circuits within said solar grid-tied inverter provide a means for converting solar photovoltaic power to AC electrical grid power,
    wherein power circuits and control circuits within said bidirectional grid-tied power converter provide a means for converting energy storage battery power to AC electrical grid power or to convert AC electrical grid power to energy storage battery power,
    wherein said solar grid-tied power converter is coupled between said solar photovoltaic modules and an electrical grid,
    wherein said bidirectional grid-tied power converter is coupled between said energy storage batteries and said electrical grid,
    wherein power circuits and control circuits within the bidirectional grid-tied power converter provide a means for said bidirectional grid-tied power converter to supply power, sourced from said energy storage batteries, in response to a dynamic event in which there is a drop in power production from said solar grid-tied inverter relative to previous solar grid-tied inverter steady state power production,
    wherein said response to said dynamic event is to supply power to the electrical grid in an amount equal to said drop in power production from said solar grid-tied inverter such that the net power into the electrical grid during said dynamic event is unchanged from that of said previous solar grid-tied inverter steady state power production, and
    wherein said means for communicating an output power level or an output current level of said solar grid-tied inverter to said bidirectional grid-tied power converter is a means for trigging said response to said dynamic event.

2. An electrical-grid-tied solar photovoltaic power system for suppling AC power to an electrical grid according to claim 1 wherein said means for communicating an output power level or an output current level of said solar grid-tied inverter to said bidirectional grid-tied power converter is a current sensor on a conductor which carries load current from the solar grid-tied inverter to the electrical grid.

3. An electrical-grid-tied solar photovoltaic power system for suppling AC power to an electrical grid according to claim 1 wherein said means for communicating an output power level or an output current level of said solar grid-tied inverter to said bidirectional grid-tied power converter is a digital communication link between the solar grid-tied inverter and the bidirectional grid-tied power converter.

4. An electrical-grid-tied solar photovoltaic power system for suppling AC power to an electrical grid according to claim 1 wherein said means for communicating an output power level or an output current level of said solar grid-tied inverter to said bidirectional grid-tied power converter is a pyranometer located in close proximity to the solar photovoltaic modules.

5. An electrical-grid-tied solar photovoltaic power system for suppling AC power to an electrical grid according to claim 1 further comprising a graphic user interface as a mean for programming system modes and gathering system performance data, system status and fault reporting.

6. An electrical-grid-tied solar photovoltaic power system for suppling AC power to an electrical grid according to claim 1 further comprising a graphic user interface as a means for the local electrical utility company to dispatch advanced power converter grid-support functions.

7. A method for grid-tied solar photovoltaic electrical power systems that provides more continuous power flow into the utility grid during atmospheric events when moving scattered cloud cover produces a choppy solar-sourced power profile with respect to time wherein the method includes using a second power converter coupled between an energy storage battery and the utility grid and wherein said second power converter delivers battery-sourced power to the electric utility grid to makeup up for the instantaneous reduction in solar-sourced power delivered to the grid, with respect to recent average power production, during said atmospheric events in order to make the net power delivered to the electrical utility grid more constant.

* * * * *